United States Patent Office 2,924,969
Patented Feb. 16, 1960

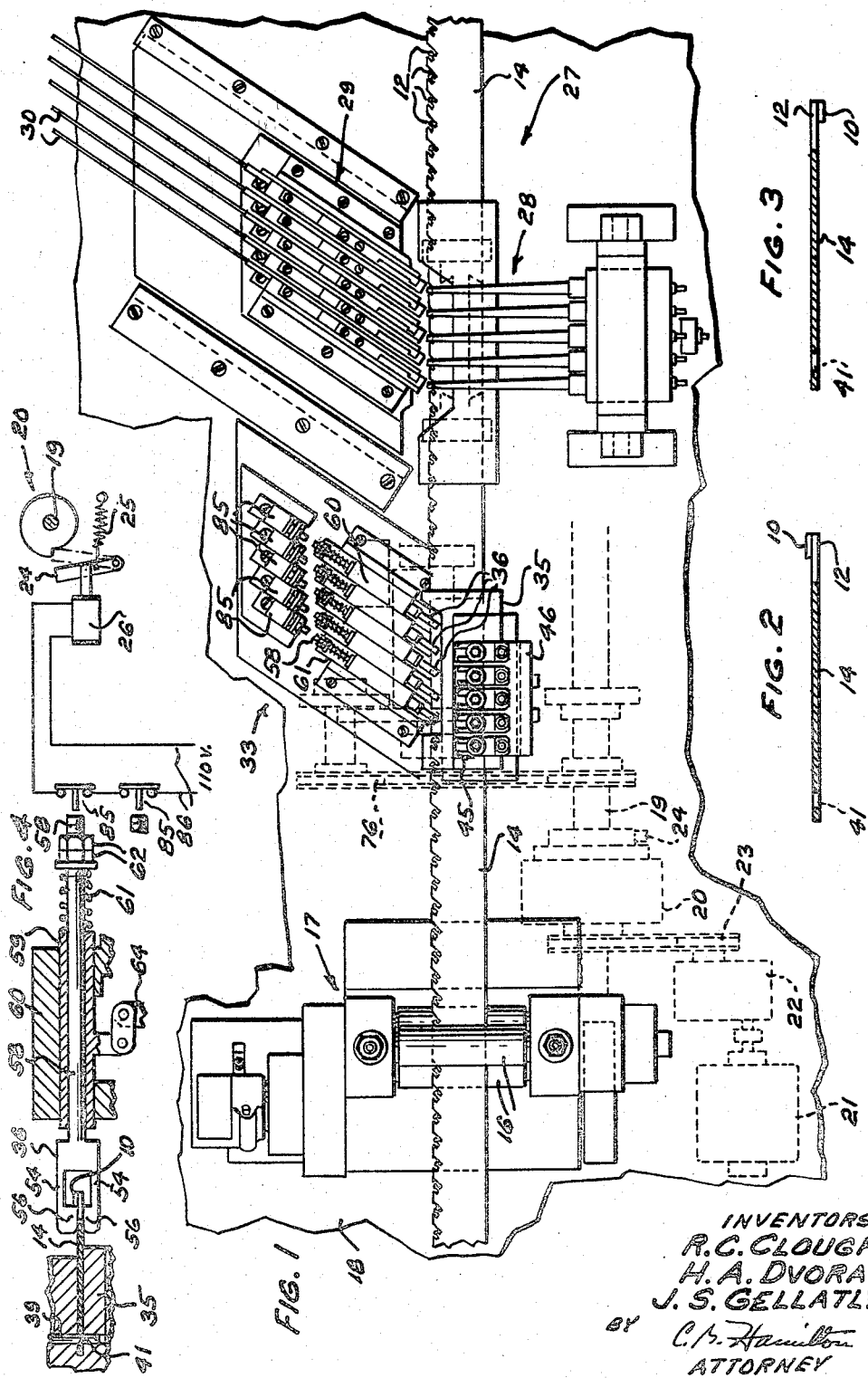

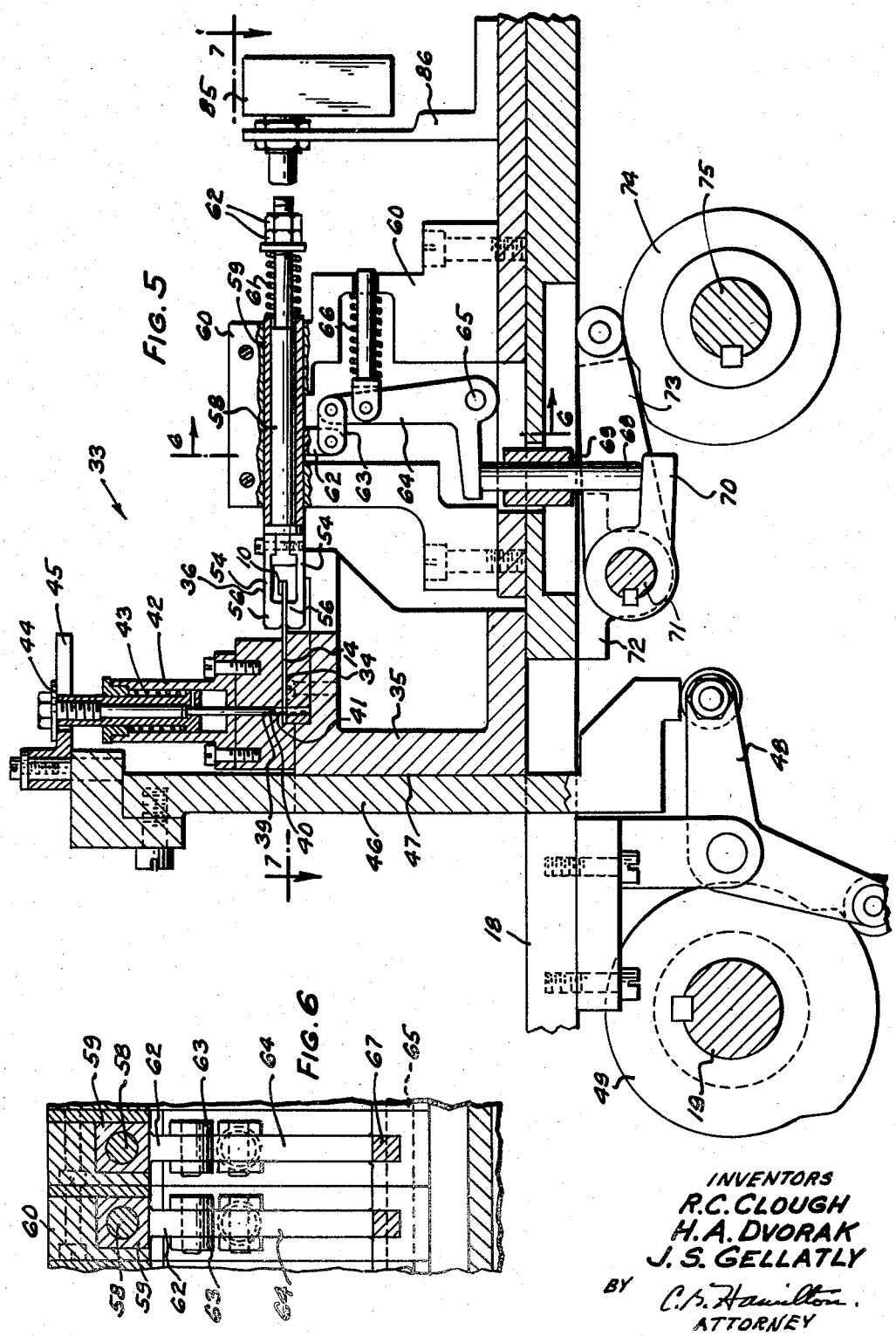

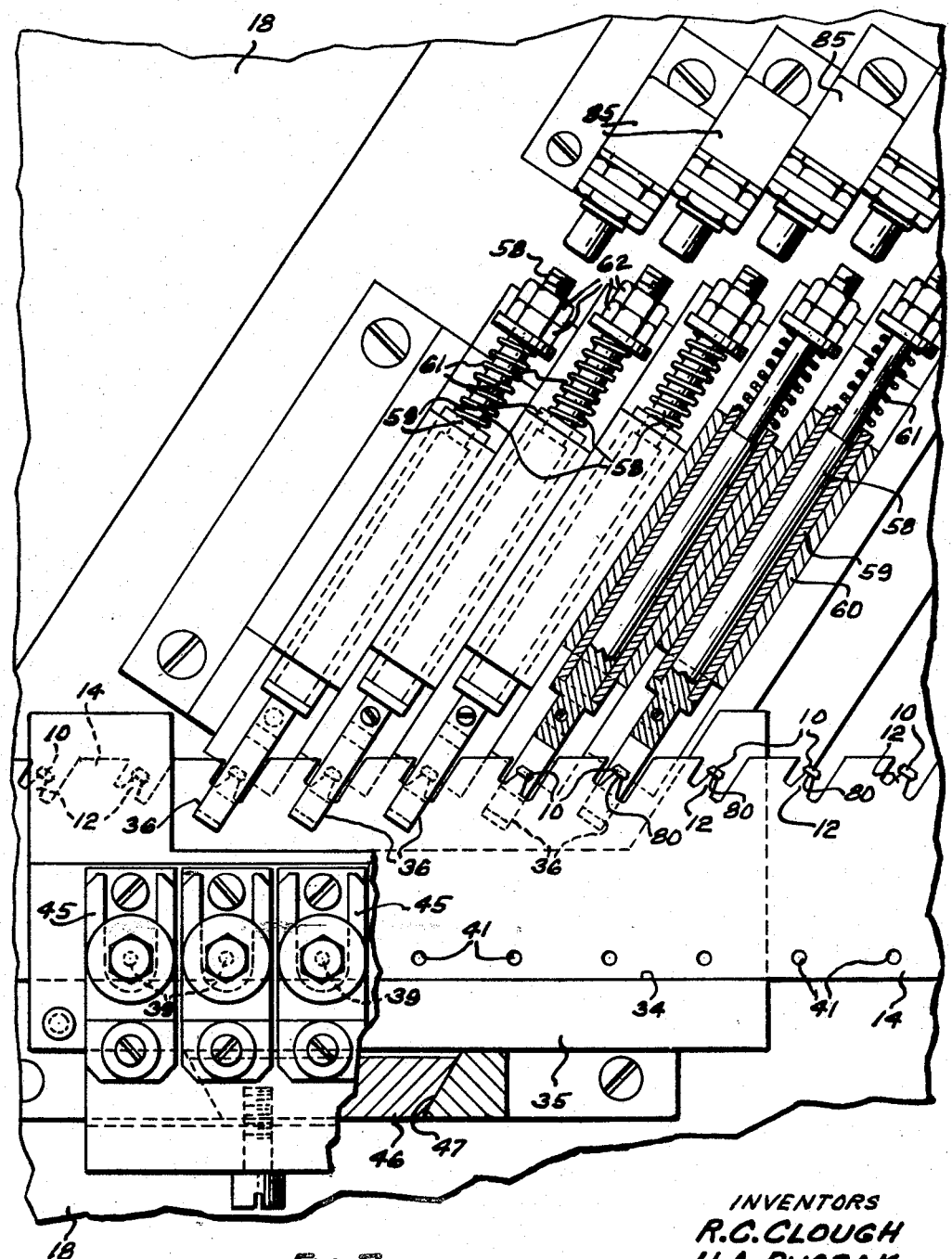

2,924,969

APPARATUS FOR TESTING THE WELD STRENGTH BETWEEN PARTS WELDED TOGETHER

Robert C. Clough, Lombard, Howard A. Dvorak, Brookfield, and John S. Gellatly, La Grange, Ill., assignors to Western Electric Company, Incorporated, New York, N.Y., a corporation of New York Application December 6, 1957, Serial No. 701,159

8 Claims. (Cl. 73—101)

This invention relates to apparatus for testing the strength of the bond between parts welded together and more particularly to an apparatus for testing the strength of the welds between a metal strip and contacts welded thereto on either side thereof.

An object of the present invention is to provide an apparatus for testing the strength of the bond between a first part and a second part welded to either side of the first part.

Another object of the invention is the provision of an apparatus for feeding a strip having contacts welded thereto on either side thereof and for testing the strength of the weld between the strip and the contacts, and having control means for rendering the apparatus inoperative when a weld fails under test.

With these and other objects in view, the invention contemplates an apparatus having means for intermittently feeding a metal strip provided with longitudinally spaced contacts welded thereto on either side thereof along a longitudinal marginal portion and for guiding the marginal portion along a predetermined path into engagement with a plurality of bifurcated shearing heads to align successive groups of the welded contacts with the shearing heads. Means are provided for individually and simultaneously actuating the shearing heads to apply a predetermined force to the contacts tending to shear them from the strip, and control means associated with the shearing heads are actuated to render the apparatus inoperative in the event of failure of the weld and the shearing of a contact from the strip.

Other objects and advantages of the invention will become apparent by reference to the following detailed description thereof and the accompanying drawings, in which Fig. 1 is a fragmentary plan view of an apparatus for testing the strength of a weld between a strip and contacts welded thereto;

Figs. 2 and 3 are cross sectional views of the strip with contacts welded onto opposite sides thereof;

Fig. 4 is a fragmentary diagrammatic cross sectional view of the apparatus for shear testing a contact welded onto a strip and of the control means therefor for rendering the apparatus inoperative in response to the failure of a weld;

Fig. 5 is a fragmentary vertical cross sectional view of the apparatus taken along line 5—5 of Fig. 1;

Fig. 6 is a fragmentary vertical cross sectional view of the apparatus taken along line 6—6 of Fig. 5; and Fig. 7 is a fragmentary plan and horizontal sectional view of the weld testing apparatus.

Referring to the drawings, the present apparatus is designed to test the weld strength of contacts 10 (Figs. 2, 3 and 7) welded onto either side of a plurality of tangs 12 formed in spaced relation to each other along one longitudinal margin of a flat metal strip 14. The strip 14 is intermittently advanced by a pair of feed rolls 16 (Fig. 1) of a strip feeding device 17 which is supported on a frame plate 18 and is driven from a main drive shaft 19 and serves to intermittently advance the strip through a predetermined distance and provide a dwell of a predetermined time interval for each revolution of the shaft 19. This shaft is driven through a one-revolution clutch 20 which in turn is driven from a motor 21 through a gear reducer 22 and a chain and sprocket connection 23. A pivoted latch 24 (Fig. 4) cooperates with a control element of the clutch to engage or disengage the clutch and connect or disconnect the motor drive to the shaft 10. A spring 25 moves the latch 24 to one position to disengage the clutch on completion of a cycle of rotation, and a solenoid 26 is provided to move the latch to another position to effect the engagement of the clutch.

The contacts 10 are selectively welded onto either side of the tangs 12 of the strip 14 at a welding station 27 (Fig. 1) by a welding mechanism 28 in cooperation with a tape feed and shearing mechanism 29 which cooperate to feed the ends of a plurality of contact tapes 30 into overlapping relation with the ends of the tangs 12, weld the ends of the tapes to the tangs, and shear the tapes to sever the welded contacts therefrom. This mechanism for welding the contacts onto the strip 14 is disclosed in the co-pending application, Serial No. 508,664, filed May 16, 1955 by R. C. Clough et al., entitled "Apparatus for Welding Contacts Onto A Part," now Patent No. 2,823,296.

After the contacts 10 have been welded to the strip 14, successive portions of the strip with five contacts thereon are advanced by the feeding device 17 to a testing station 33 where a predetermined force is applied to the contacts 10, individually, to test the strength of the welds between the contacts and the strip. In the test station 33, the strip 14 is supported in a guideway 34 of a guide 35 which is mounted on the frame plate 18 and supports the strip with the marginal portion containing the contacts 10 thereon extending laterally therefrom for engagement by a plurality of bifurcated shearing heads 36 for applying a predetermined shearing force to the contacts.

Means are provided for holding the strip 14 against movement while the contacts are being tested which includes a plurality of locking pins 39 slidable in apertures 40 in the guide 36 and engageable in apertures 41 in the strip 14. The upper portions of the pins 39 which are guided in cylindrical guide members 42 are urged downwardly by springs 43 and have enlarged heads 44 which are supported on slotted members 45 on the upper end of a slide 46. The slide 46 is vertically movable in a guideway 47 in the guide 35 and is actuated by a bell-crank lever 48 in cooperation with a cam 49 on the main drive shaft 19, the arrangement being such that the locking pins 39 are actuated to hold the strip 14 between feeding intervals of the strip and during the application of shearing force to the contacts 10 thereon.

Each of the bifurcated shearing heads 36 has a pair of horizontally disposed shearing members 54 mounted in vertically spaced relation to each other to provide a horizontal clearance slot for receiving portions of the strip 14 with the contacts 10 thereon. The shearing members 54 have enlarged ends forming shoulders or abutments 56 engageable with a contact 10 welded to either side of the strip 14 for applying shearing force thereto in response to movement of the shearing head 36 away from the strip. Opposing surfaces of the enlarged ends of the shearing members 54 support the strip 14 against vertical displacement during the shear-testing operation. The shearing heads 36 (Figs. 4–7) are fixed to rods 58 slidably mounted in apertures of carriers 59 which are mounted for slidable movement in a housing 60 mounted on the frame plate 18. Helical springs 61 interposed between the ends of the carriers 59 and pairs of adjustable nuts 62 on the rods 58 yieldably maintain the shearing heads 36 in engagement with one end of the carriers and serve as yieldable connections between the shearing heads and the actuating means therefor.

The carriers 59 have depending lugs 62 which are connected through links 63 to bell cranks 64 which are pivotally supported on a shaft 65 and are urged in a counterclockwise direction as viewed in Fig. 5 by springs 66. Arms 67 of the bell cranks engage the upper ends of pusher rods 68 which are guided for vertical movement in a guide 69 and rest on a wide lever 70 secured to a rock shaft 71. This rock shaft is supported in bearings 72 secured to the frame plate 18 and has a cam lever 73 fixed thereto which is actuated by a cam 74 keyed to a cam shaft 75. The shaft 75 is connected through a chain and sprocket connection 76 to the main drive shaft 19 and is rotated thereby in synchronism therewith.

As seen in Fig. 7, the tangs 12 and the elongated contacts 10 welded thereto are disposed obliquely relative to the longitudinal edge of the strip 14, and the shearing heads 36 and the actuating mechanisms therefor are also obliquely disposed to position the shearing shoulders 56 formed on the enlarged ends of the shearing members 54 in parallel relation to the edges 80 of the contacts 10 for engagement therewith to provide for a substantial and solid connection between the contacts 10 and the shearing heads for the application of shearing force to the contacts. In their normal position, the shearing heads 36 are located so that the openings 55 therein are located to provide clearance for the movement of the edge portion of the strip 14 and the contacts 10 welded thereon to pass therethrough during the intermittent feeding movement of the strip. At the end of each feeding movement of the strip 14, a predetermined number of the contacts 10 are aligned with the shearing heads 36 and in response to actuation by the cam 74, the bell-rank levers 64 are oscillated in a clockwise direction as viewed in Fig. 5 to cause the carriers 59 to move to the right through a predetermined stroke, thereby compressing the springs 61 and causing the shearing heads 36 to be moved into engagement with the contacts 10 and apply predetermined shearing force thereto tending to shear the contacts from the strip 14. The shearing heads 36 are then returned to their nomal positions by the action of the cam 74 and springs 61.

Control means are provided to stop the apparatus in response to the failure of a weld and the shearing of a contact 10 from the strip 14. This control means includes a plurality of normally closed switches 85 mounted on brackets 86 (Figs. 5 and 7) in alignment with and in a predetermined position adjacent to the ends of the rods 58 of the shearing heads 36. The normally closed switches 85 are connected in series with the solenoid 26 (Fig. 4) to a powerline 86 and complete a circuit to energize the solenoid 26 and cause it to pull the latch 24 from the clutch to effect the engagement of the clutch and the connection of the motor drive to the apparatus. When one of the switches is actuated to open position in response to failure of a weld and the shearing of a contact 10, the solenoid circuit is opened and the solenoid 88 deenergized, and the latch is moved to its other position to disengage the clutch and effect the disconnection of the motor drive at the end of a cycle of rotation of the drive shaft 19.

In the operation of the apparatus with the motor running and the control switches 85 in closed position and with the one-revolution clutch engaged, the strip feed device 17 is operated to intermittently advance the strip 14 predetermined distances to align successive groups of tangs 12 with the welding electrodes in the welding station 27 and align successive groups of tangs with contacts 10 thereon with the shearing heads 36 in the shear testing station 33 and to stop the strip 14 for predetermined intervals between feeding movements. During such intervals, contacts are formed and welded onto the tangs at the welding station 27, and at the test station 33 the stop pins are moved into the apertures 41 in the strip 14 to lock the strip against movement, and the bell-crank levers 64 are actuated to reciprocate the carriers 59 through a predetermined stroke. As the carriers 59 move away from the strip, the shearing heads 36 are moved therewith into engagement with the contacts 10 on the strip 14 and are arrested thereby as the carriers 59 continue their movements away from the heads and further compress the springs 61 to apply a predetermined force to each of the contacts 10 individually for a predetermined interval of time. The cam 74, in cooperation with the springs 66, then serves to effect the return of the shearing heads 36 to their normal position in disengaged relation to the contacts 10. The locking pins 39 are then elevated to release the strip 14 after which the strip feed device 17 operates to advance the strip 14 another increment of movement preparatory to the next cycle of operation.

In the event that a weld fails and a contact 10 is sheared from the strip 14 by a shearing head 36, this shearing head 36 is no longer restrained by the contact 10 and the spring 61 moves the head 36 and the rod 58 to the right as viewed in Fig. 4 and causes the rod 58 to actuate the switch 85 in its path and open the circuit to the solenoid 26 and effects its deenergization. The spring 25 will then return the latch 24 to its normal position and effect the disengagement of the one-revolution clutch 21 and the disconnection of the motor drive from the main drive shaft 19 and thus render the apparatus inoperative.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for shear testing the weld strength between a first part and a second part welded to one side of the first part, means for holding the first part against movement in one direction and with a marginal portion thereof extending from the holding means with the second part thereon, a bifurcated shearing head having space elements disposed on opposite sides of said marginal portion of the first part for engaging and stressing the second part in response to movement of the shearing head in said one direction and for supporting said marginal portion of the first part against bending movement during the application of stress to the second part, and means for moving said shearing head in said one direction to apply a predetermined stress to said second part tending to shear it from the first part.

2. In an apparatus for shear testing the bond between a flat metal spring and a contact welded thereon, a holder for supporting the flat spring against movement and with a portion thereof with the contact thereon projecting from the holder, a shearing head having a pair of spaced shearing members disposed on opposite sides of said projecting portion of the spring for supporting said projecting portion against displacement transversely of the spring, said pair of shearing members having surfaces for engaging and stressing a contact welded to one side of the flat spring, and means for moving the shearing head away from the holder to apply a predetermined stress to the contact tending to shear it from the spring.

3. In an apparatus for shear testing the bond between a flat metal spring and a contact welded thereto, a holder for supporting the flat spring against movement in one direction and with a portion thereof with the contact thereon extending from the holder, a shearing head having a pair of spaced members disposed on opposite sides of said portion of the spring for supporting it against displacement transversely of the spring, at least one of the members having a shoulder disposed opposite the other member for engaging the contact on the flat spring and applying shearing stress thereto tending to shear the contact from the spring in response to movement of the shearing head in said one direction, and means for moving the shearing head in said one direction to apply a predetermined stress to the contact.

4. In an apparatus for testing the strength of the bond between a strip and contacts welded to one side of the strip along one edge thereof, a guide for supporting said strip for movement along a predetermined path with the marginal portion having the contacts thereon extending from the guide, feed means for intermittently advancing the strip, means for releasably securing the strip onto the guide, a shearing head having a pair of members for receiving the strip and the contacts therebetween and for supporting the strip against displacement transversely of the strip, at least one of said members having an abutment located opposite the other member and engageable with a contact welded to the strip, means for actuating the shearing head to apply a predetermined force to the contact tending to shear it from the strip, and drive means for driving the strip feed means, the strip securing means and the shearing head actuating means in a predetermined sequence.

5. An apparatus for testing the strength of the welds between a strip and contacts welded to the strip along one edge thereof which comprises a guide for supporting said strip for movement along a predetermined path with the marginal portion having the contacts thereon extending from the guide; feed means for intermittently advancing the strip; means for releasably securing the strip to the guide against lateral movement in one direction; a shearing head having a pair of members for receiving the strip and the contacts therebetween and for supporting the strip against displacement transversely of the strip, at least one of said members having an abutment disposed opposite the other member and engageable with a contact welded to the strip; means for moving the shearing head in said one direction to apply a predetermined stress to the contact tending to shear it from the strip; drive means for sequentially actuating the strip feeding means, the strip securing means, and the shearing head moving means; and control means for rendering the drive means inoperative in response to the shearing of a contact from the strip.

6. In an apparatus for testing the strength of the bond between a strip and contacts welded to the strip along one edge thereof, a guide for supporting said strip for movement along a predetermined path with the marginal portion having the contacts thereon extending outwardly from the guide; feed means for intermittently advancing the strip; holding pins movably mounted on the guide and engageable in apertures in said strip; actuating means for moving the holding pins into and out of engagement with the apertures in the strip; a shearing head having a pair of shearing members for receiving the strip and the contacts therebetween and supporting the strip against displacement transversely of the strip, said shearing members having abutments engageable with a contact welded to the strip on one side thereof; means for moving the shearing head away from the guide to apply a predetermined force to the contact tending to shear it from the strip; drive means for driving the strip feeding means, the pin actuating means, and the shearing head moving means in timed relation to one another; and control means for rendering the drive means inoperative in response to the shearing of a contact from the strip.

7. In an apparatus for testing the strength of the welds between a metal strip and contacts welded thereto along one edge, means for supporting the strip for longitudinal feeding movement along a predetermined path with a marginal portion of the strip including the contacts extending from the supporting means; means on said supporting means for releasably securing the strip against lateral movement in one direction while the contact is being tested; a shearing head having a pair of opposed shearing members for engaging a contact welded to one side of the strip; means for supporting the shearing head for reciprocable movement parallel to said one direction to and from a normal position with the shearing members disposed on opposite sides of said marginal portion of the strip for supporting said marginal portion against displacement transversely of the strip; feeding means for intermittently advancing said strip to position successive contacts thereon in alignment with the shearing head; means for moving said shearing head in said one direction to apply a predetermined force to the contact tending to shear it from the strip; drive means for sequentially actuating the tape feeding means, the tape securing means, and the shearing head moving means, and means operable in response to the shearing of a contact for rendering the drive means inoperable.

8. In an apparatus for testing the strength of the bond between a strip and contacts welded to the strip along one edge thereof, a guide for supporting said strip for movement along a predetermined path with the marginal portion having the contacts thereon extending from the guide; feeding means for intermittently advancing the strip; means on the guide for holding the strip against movement laterally from the guide in one direction; a shearing head having a pair of shearing members for receiving the strip and the contacts therebetween and for supporting the strip against displacement transversely of the strip; said shearing members having abutments engageable with contacts welded to the strip on one side thereof for applying stress to the contact tending to shear it from the strip in response to movement of the shearing head in said one direction; a carrier movable along said one direction for supporting said shearing head for movement therewith and for movement relative thereto; resilient means for yieldably maintaining said shearing head in a normal position on said carrier; means for moving said carrier through a predetermined stroke to cause the carrier to bring the shearing head into engagement with the contact and to move a predetermined distance thereafter to compress the resilient means and apply a predetermined stress to said contacts whereby in response to the shearing of a contact the shearing head transverses a predetermined additional distance; drive means for sequentially actuating said strip feeding means, said strip holding means, and said shearing head moving means; and control means actuated by the movement of said shear head through said predetermined additional distance for rendering the drive means inoperable.

References Cited in the file of this patent

UNITED STATES PATENTS

| 2,100,502 | Campbell et al. | Nov. 30, 1937 |
| 2,261,783 | Stull | Nov. 4, 1941 |
| 2,353,056 | Martindell | July 4, 1944 |
| 2,855,496 | Lawless et al. | Oct. 7, 1958 |